United States Patent
Zincone

[11] 3,754,840
[45] Aug. 28, 1973

[54] COMPOSITE HELICOPTER ROTOR AND BLADE

[75] Inventor: Robert Zincone, Norwalk, Conn.
[73] Assignee: United Aircraft Corporation, East Hartford, Conn.
[22] Filed: May 31, 1972
[21] Appl. No.: 258,147

[52] U.S. Cl. ............... 416/226, 416/230, 416/241
[51] Int. Cl. ........................................... B64c 27/46
[58] Field of Search ................... 416/226, 229, 230, 416/241 A

[56] References Cited
UNITED STATES PATENTS

| | | | |
|---|---|---|---|
| 3,237,697 | 3/1966 | Ford et al. | 416/241 |
| 3,477,796 | 11/1969 | Weiland | 416/226 X |
| 3,528,753 | 9/1970 | Dutton et al. | 416/226 |
| 3,533,714 | 10/1970 | Pfleiderer | 416/230 X |

FOREIGN PATENTS OR APPLICATIONS

| | | | |
|---|---|---|---|
| 1,334,446 | 7/1963 | Germany | 416/230 |
| 1,531,374 | 1/1970 | Germany | 416/241 |

Primary Examiner—Everette A. Powell, Jr.
Attorney—Vernon F. Hauschild

[57] ABSTRACT

A composite helicopter rotor and balde is produced by building the blade around a selectively fabricated structural spar which includes a central filler member and a plurality of fiber members commencing at the blade tip, extending substantially for its full length to the blade root, extending therebeyond and then folding back upon itself to form a loop, and then extending along the other side of the filler member to substantially the tip of the blade again and being bonded to the opposite sides of the filler member. The spar is then bonded on both upper and lower spar surfaces to the blade cuff attachment member, which includes a pin about which the loop is formed. Redundant retention therefore occurs through either of the bond areas between the cuff attachment member and the fiber members, and by means of the pin-type member. Preferably the fiber members are unidirectional. Additional layers of fiber members are wrapped around the spar at its root end and extend in various directions on opposite sides of the blade so as to form a cylindrical or oval shaped boot to carry blade torsional loads.

29 Claims, 6 Drawing Figures

Patented Aug. 28, 1973 3,754,840
3 Sheets-Sheet 1
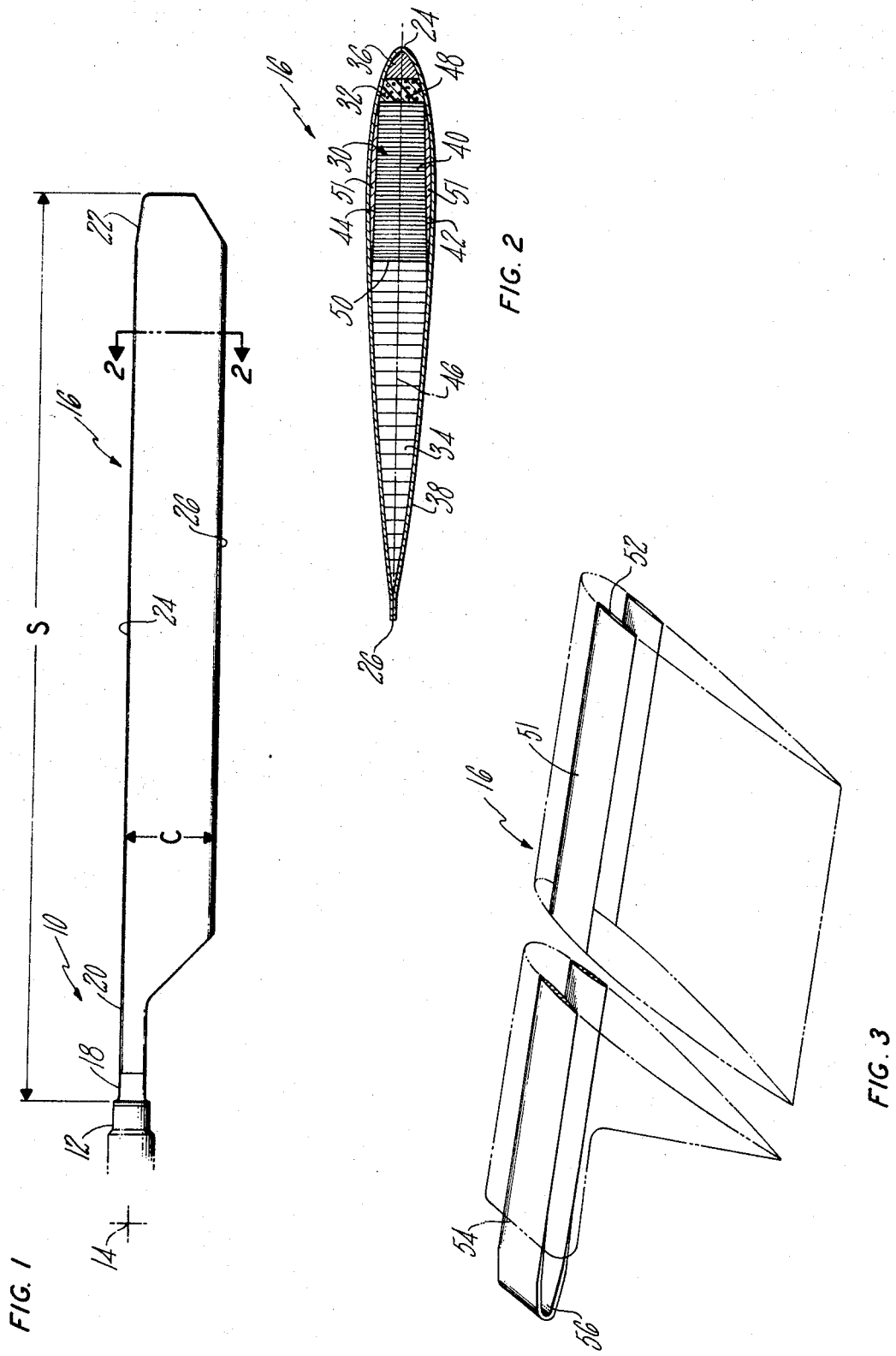

COMPOSITE HELICOPTER ROTOR AND BLADE

CROSS-REFERENCES TO RELATED APPLICATIONS

A second patent application is being filed on even date herewith on a related construction in the names of M. Salkind and W. Reinfelder and entitled "Composite Aerodynamic Blade with Twin-Beam Spar."

BACKGROUND OF THE INVENTION

1. Field of Invention

This invention relates to a helicopter blades and more particularly to helicopter blades of the composite types which include redundant structure for connecting the nonmetallic helicopter blade to a metallic cuff or hub fitting, and which has provisions for carrying both the centrifugal and the torsional loads of the blade.

2. Description of the Prior Art

In the helicopter rotor and compressor and turbine blade art, strand-type members have been used to connect a blade to a hub-mechanism through a pin, but none have been used so as to produce a helicopter structural spar, or blade, with redundant load carrying capabilities between the spar and the hub.

In Delker U.S. Pat. No. 3,434,372, Wilford et al. U.S. Pat. No. 2,961,051, Tankersley U.S. Pat. No. 3,460,628, and Elgerd U.S. Pat. No. 3,228,481, items such as helicopter blades are attached to items such as helicopter hubs using fiber-type materials but these materials do not extend into and form part of the helicopter spar or blade with redundant load carrying provisions. The U.S. Pats. to Rubel, No. 2,919,889, and Warnken, No. 2,859,936 attach compressor blades to a compressor hub through wire or fiber-type mechanisms passing around a pin but these patents do not teach the redundant load carrying spar construction of my invention. British Pat. No. 973,587 dated Oct. 28, 1964 to Bolkow, British Pat. No. 756,673 dated Sept. 5, 1956 to Clemens, Havill U.S. Pat. No. 1,846,258 and Brunsch U.S. Pat. No. 3,476,484 all teach the use of strand members extending from a helicopter or propeller blade to a hub and extending around a pin as blade retention means but none of these teach the redundant load carrying feature of my invention.

The U.S. Pats. to Ford, No. 3,237,697, and Dutton et al., No. 3,528,753, both teach the use of fiber members extending in different directions in a helicopter blade, but neither of these utilize the spar or blade form taught herein.

U.S. Pat. No. 3,476,484 to Brunsch teaches the use of two, double looped flanges of fibers for blade retention about pins but includes no redundancy feature as taught herein. U.S. Pat. No. 3,533,714 to Pfleiderer teaches the use of fibers passing around a blade root connecting member but their function is to retain a trimming weight.

SUMMARY OF INVENTION

The primary object of the present invention is to provide a composite helicopter blade with provisions for connecting the blade to a rotor so as to provide as many as three load carrying paths for blade centrifugal loads.

In accordance with the present invention, fiber members or rovings of U-shape general form cooperate with a central core member so that the legs of the U-shape fiber system are bonded to opposite sides of the core or filler material and so that the loop of the U extends toward the blade root from the core so that a root retaining pin may be passed therethrough, and so that the exterior surfaces of the opposite legs of the U-shaped fiber formation can be bonded to opposite sides of the blade cuff so as to provide redundant retention of the blade to the cuff and so that the core and U-shape fiber assembly carry the blade centrifugal loading and the blade bending loads.

In accordance with the present invention, a torque boot envelops the root portion of the blade in the form of a plurality of layers of fiber material extending in different directions, some on opposite sides of the blade span direction, so as to carry the torsional blade loading therethrough with the assistance of fiber material extending in the optimum direction for any such torsional load.

Other objects and advantages of the present invention may be seen by referring to the following description and claims, read in conjunction with the accompanying drawings.

BRIEF DESCRIPTION OF THE DRAWINGS

FIG. 1 is a plan view of a helicopter blade utilizing my invention.

FIG. 2 is a cross-sectional showing along line 2—2 of FIG. 1.

FIG. 3 is a fragmentary, perspective, enlarged showing of my blade principal spar member.

DESCRIPTION OF THE PREFERRED EMBODIMENT

Figure 4:
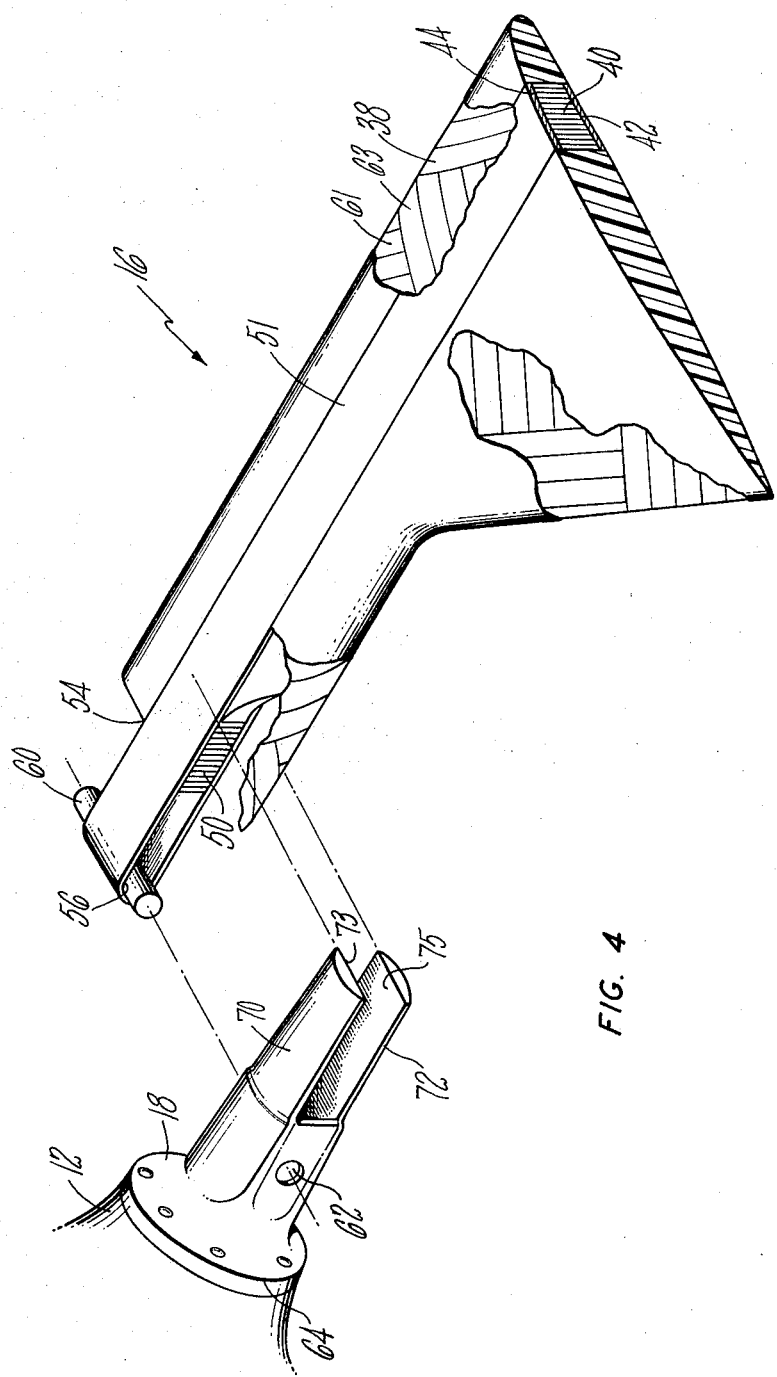
FIG. 4 is a perspective, enlarged showing of the root end of my composite helicopter blade showing the method of attachment of the blade to the rotor hub.

Referring to FIG. 1, we see helicopter rotor 10, which comprises hub member 12 mounted in conventional fashion for rotation about axis of rotation 14 and which includes a plurality of composite blades such as 16 extending radially from hub 12 for rotation therewith so as to generate lift. Each of blades 16 is composite in that the major portion thereof is made of nonmetallic, lightweight material, such as glass fiber and epoxy, but is attached through my unique root-end fitting to the rotor 12 through cuff member 18 in a fashion to be described in greater particularity hereinafter. Blade 16 has a root end 20, a tip end 22, a chord dimension C, and a span dimension S, a leading edge 24, and a trailing edge 26. Hub 12 may be of the type described more fully in U.S. Pat. No. 3,097,701.

Now referring to FIG. 2 it will be seen that blade 16 includes structural spar 30 with filler material, such as foam or honeycomb, positioned forwardly thereof in the form of leading edge filler 32 and rearwardly thereof in the form of trailing edge filler 34. Leading edge filler 32 may include counterweight 36, which extends along the span S of the blade for aerodynamic balance purposes. Spar 30, leading edge filler 32, with or without counterweights 36, and trailing edge filler 34 are interconnected and wrapped within skin member 38.

Spar 30 can best be understood by viewing FIGS. 2, 3 and 4 and comprises central filler member 40, which extends from the blade spar tip end to the blade spar root end and which has two side surfaces 42 and 44 which are parallel to and spaced on opposite sides from the blade chord line 46. The forward surface 48 of filler member 40 is attached to forward filler member 32, and the after surface 50 of central filler member 40 is attached to after filler member 34 by conventional bonding agents. A plurality of fibers 51 such as unidirectional glass fiber or boron, extend from spar tip 52 on one side 44 of central filler member 40 and extend along the blade span to and beyond the spar root end 54 and double back upon themselves to form loops 56 and then extend along the opposite wall 42 of the central member 40 to the spar tip again. Fiber members 51 are preferably continuous and, it will be noted, are laid up to form the letter U. The plurality of fiber members 51 are bonded to the opposite sides 42 and 44 of central filler member 40 and to each other by convention bonding means. Member 51 may be made of a series of individual rovings, cloth or broad goods. As best shown in FIG. 4, pin member 60 passes through loop 56, and the opposite ends thereof pass through aligned apertures, such as 62, in blade cuff 18, which is in turn connected by conventional bolt mechanisms through bolt flange 64 to blade hub 12. Blade cuff extensions 70, 72 overlap the blade spar on both its upper and lower surfaces, 44 and 46, and are bonded thereto to form the primary and redundant centrifugal load paths from the blade to the rotor hub. The pin/cuff attachment forms a secondary load path for such loading in the event of failure of both the upper and lower blade/cuff bonds.

It will therefore be seen that blade 16 is connected to hub 12 by redundant load carrying paths with respect to blade centrifugal loading. The first of these paths is the bond between the inner surface 73 of cuff extension 70 and the fiber members 51, the second of these paths is the bond between the inner surface 75 of cuff extension 72 and fiber members 51, and the third load carrying path is through retaining pin 60 to the inner portion of cuff member 18. These three paths are shown as arrow A, B and C in FIG. 5.

As best shown in FIG. 4, the skin 38 of blade 16 comprises a plurality of layers, such as 61 and 63 of fiber members extending in various directions with respect to the blade axis or span S, and preferably at 45 degrees on opposite sides thereof, in a layer-by-layer basis. This construction preferably provides skin strength in various directions under blade loading.

Figure 5:
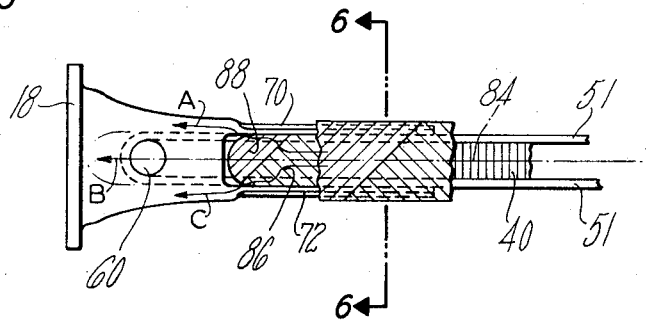
FIG. 5 is a side view of my blade, partially broken away to illustrate the torsion or torque boot.
Figure 6:
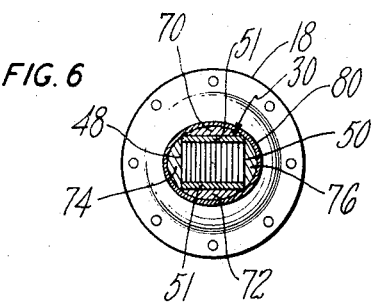
FIG. 6 is a view taken along line 6—6 of FIG. 5.

In addition, preferably, a torsional boot 80 (FIG. 6) envelops the blade at its root end to carry torsional loads. Selectively shaped filler plate members 74 and 76 are positioned and bonded to faces 48 and 50 of central filler member 40 and cooperate with spar 16 and members 70 and 72 to form a structure of substantially circular or oval cross section to support the torque boot 80. Torque or torsion boot 80 envelops the cylindrical or oval shaped structure so formed as a plurality of layers forming different angles on opposite sides of the blade axis or span S, signified by a line 84 in FIG. 5. As best shown in FIG. 5, the strands of layer 86 form an angle of about 45 degrees on one side of axis 84, while the strands of superimposed layer 88 form an angle of about 45 degrees on the opposite side of longitudinal axis 84. These plurality of layers, such as 86 and 88, accordingly form torsion boot 80 which serves to carry torsion loads between blade 16 and hub 12.

Cuff 18 is preferably made of titanium.

The bonding of the various parts of my blade can be accomplished by laying up the blade as discussed herein and then placing it in a properly shaped autoclave or die system under proper and conventional temperature and pressure conditions to produce the airfoil shape desired.

Spar fibers 51, blade skin fibers 61 and 63, and torque boot layers 86 and 88 are preferably fiber composites, such as epoxy impregnated glass fibers but could also be bonded metal wires or bonded plastic or metal sheets, each used as the sole fabricating material or in combination with other fabricating materials.

While blade 16 has been described herein as including central filler material 40, and the other filler materials 34 and 32, each of these filler materials is utilized primarily for shape stability and, while the disclosed embodiment is the preferred embodiment, it should be borne in mind that the main structural parts of blade 16 are blade skin 38, with torque tube 80, and the fiber composite spar 30, bonded thereto. If these principal structural parts 38 and 30 were fabricated sufficiently rigid so as to be able to carry all blade loads while maintaining their aerodynamic shape, the filler materials, and possibly the counterweight 36 would not be needed. Preferably blade skin 38, torque boot 80 and spar 30 are made in separate layers, with the layers of the spar 30 interleaved with the layers of the skin 38 and torque boot 80.

I wish it to be understood that I do not desire to be limited to the exact details of construction shown and described, for obvious modifications will occur to a person skilled in the art.

I claim:

1. A composite helicopter blade having:
    A. a structural spar including:
        1. a central lightweight filler member extending along the blade span between substantially the blade root and the blade tip,
        2. a plurality of high strength fiber members extending between the blade tip on one side of said filler member to the blade root and therebeyond and then doubling back so as to form a loop and then extending from the blade root to the blade tip on the opposite side of said filler member and being bonded to said filler member on both sides thereof throughout substantially the full span dimension of the filler member,
    B. means adapted to connect said structural spar to a rotor including:
        1. a first member bonded to the exterior of said fiber members on one side of said filler member,
        2. a second member bonded to the exterior of said fiber members on the opposite side of said filler member,
        3. a pin member extending through said loop in said fiber members, and
        4. means adapted to connect said first and second members and said pin member to the rotor.
2. A blade according to claim 1 and including:
    A. additional filler material of selected shape and connected to said spar to cooperate therewith in forming the blade cross-sectional shape, and
    B. a skin member enveloping said spar and said additional filler material to produce a smooth blade surface.
3. A blade according to claim 1 wherein said fiber members are unidirectional glass fibers.

4. A blade according to claim 2 wherein said skin member includes a plurality of layers of fiber members each extending in a direction so as to form an angle with respect to the blade longitudinal axis and having layers forming angles on opposite sides of the blade longitudinal axis so as to form a torque load carrying boot.

5. A blade according to claim 4 wherein said torque boot is of substantially circular or oval cross section.

6. A blade according to claim 1 and including a torque boot made of composite material comprising a plurality of layers of fibrous material extending in different directions and enveloping the blade at the blade root so as to carry blade torsional loads.

7. A composite helicopter blade having:
   A. a structural spar including:
      1. a central lightweight filler member extending along the blade span between substantially the blade root and the blade tip,
      2. a plurality of high strength fiber members extending between the blade tip on one side of said filler member to the blade root and therebeyond and then doubling back so as to form a loop and then extending from the blade root to the blade tip on the opposite side of said filler member and being bonded to said filler member on both sides thereof throughout substantially the full span dimension of the filler member,
   B. a blade root cuff member including:
      1. a first blade cuff extension member overlapping the blade spar and bonded to the exterior of said fiber members on one side of said filler member,
      2. a second blade cuff extension member overlapping the blade spar and bonded to the exterior of said fiber members on the opposite side of said filler member,
      3. aligned apertures in said cuff member, and
   C. a pin member extending through said aligned apertures and through said loop in said fiber members.

8. A helicopter rotor including:
   A. a hub mounted for rotation about an axis of rotation,
   B. a plurality of blades connected to and extending from said hub for rotation therewith to generate lift, each of said blades including:
      1. a structural spar including:
         a. a central lightweight filler member extending along the blade longitudinal axis between substantially the blade root and the blade tip,
         b. a plurality of continuous, high strength fiber members extending between the blade tip on one side of said filler member to the blade root and therebeyond and then doubling back so as to form a loop and then extending from the blade root to the blade tip on the opposite side of said filer member and being bonded to said filler member on both sides thereof throughout substantially the full span dimension of the filler member,
      C. means adapted to connect said structural spar to a rotor including:
         1. a first member bonded to the exterior of said fiber members on one side of said filler member,
         2. a second member bonded to the exterior of said fiber members on the opposite side of said filler member,
         3. a pin member extending through said loop in said fiber members, and
         4. means adapted to connect said first and second members and said pin member to the rotor.

9. A rotor according to claim 8 and including:
   A. additional filler material of selected shape and connected to said spar to cooperate therewith in forming the blade cross-sectional shape, and
   B. a skin member enveloping said spar and said additional filler material to produce a smooth blade surface.

10. A blade according to claim 8 wherein said skin member includes a plurality of layers of fiber members each extending in a direction so as to form an angle with respect to the blade longitudinal axis and having layers forming angles on opposite sides of the blade longitudinal axis so as to form a torque load carrying boot.

11. A blade according to claim 10 wherein said torque boot is of substantially circular or oval cross section.

12. A blade according to claim 8 and including a torque boot is made of composite material comprising a plurality of layers of fibrous material extending in differet directions and enveloping the blade at the blade root so as to carry blade torsional loads.

13. A composite helicopter blade having a span and a chord and also having:
   A. a structural spar including:
      1. a central lightweight filler member extending along the blade longitudinal axis between substantially the blade root and the blade tip and having substantially flat sides extending substantially parallel to and on opposite sides of said blade chord,
      2. a plurality of continuous, high strength fiber members extending between the blade tip on one of said sides of said filler member to the blade root and therebeyond and then doubling back so as to form a loop and then extending from the blade root to the blade tip on the opposite of said sides of said filler member and being bonded to said filler member on both of said sides thereof throughout substantially the full span dimension of the filler member,
   B. means adapted to connect said structural spar to a rotor including:
      1. a first member bonded to the exterior of said fiber members on one side of said filler member,
      2. a second member bonded to the exterior of said fiber members on the opposite side of said filler member,
      3. a pin member extending through said loop in said fiber members, and
      4. means adapted to connect said first and second members and said pin member to the rotor.

14. A blade according to claim 13 and including:
   A. additional filler material of selected shape and connected to said spar to cooperate therewith in forming the blade cross-sectional shape, and
   B. a skin member enveloping said spar and said additional filler material to produce a smooth blade surface.

15. A composite helicopter blade having:
   A. a structural spar including:

1. a central lightweight filler member extending along the blade longitudinal axis between substantially the blade root and the blade tip,
2. a plurality of continuous, high strength fiber members extending between the blade tip on one side of said filler member to the blade root and therebeyond and then doubling back so as to form a loop and then extending from the blade root to the blade tip on the opposite side of said filler member and being bonded to said filler member on both sides thereof throughout substantially the full span dimension of the filler member, B. additional filler material of selected shape and connected to said spar to cooperate therewith in forming the blade cross-sectional shape and including:
1. a counterweight member extending along the blade span at the blade leading edge, C. a skin member enveloping said spar and said additional filler material to produce a smooth blade surface, D. means adapted to connect said structural spar to a rotor including:
1. a first member bonded to the exterior of said fiber members on one side of said filler member,
2. a second member bonded to the exterior of said fiber members on the opposite side of said filler member,
3. a pin member extending through said loop in said fiber members, and
4. means adapted to connect said first and second members and said pin member to the rotor.

16. A composite helicopter blade having:
A. a structural spar including:
1. a central lightweight filler member extending along the blade span between substantially the blade root and the blade tip,
2. a plurality of high strength fiber members of substantially U-shaped cross section with the two legs thereof extending substantially between the blade tip end and the blade root end and bonded to said filler member and with the curved portion of the U forming a loop extending beyond the blade root end of said filler member, B. means adapted to connect said structural spar to a rotor including:
1. a first means bonded to one leg of said fiber members,
2. a second means bonded to the other leg of said fiber members,
3. a third means extending through said loop in said fiber members, and
4. means adapted to connect said first, second, and third means to the rotor.

17. A composite helicopter blade having:
A. a structural spar including:
1. a central lightweight filler member extending along the blade span between substantially the blade root and the blade tip,
2. a plurality of high strength fiber members of substantially U-shaped cross section with the two legs thereof extending substantially between the blade tip end and the blade root end and bonded to said filler member and with the curved portion of the U forming the loop extending beyond the blade root end of said filler member, B. a blade root cuff membering including:
1. a first means bonded to one leg of said fiber members,
2. a second means bonded to the other leg of said fiber members,
3. a third means extending through said loop in said fiber members, and
4. means adapted to connected said first, second, and third means to the rotor.

18. A helicopter rotor including:
A. a hub mounted for rotation about an axis of rotation,
B. a plurality of blades connected to and extending from said hub for rotation therewith to generate lift, each of said blades including:
1. a structural spar including:
a. a central lightweight filler member extending along the blade longitudinal axis between substantially the blade root and the blade tip,
b. a plurality of continuous, high strength fiber members extending substantially between the blade tip end of said filler member to the blade root end thereof and connected to said filler member throughout and shaped to form a loop extending beyond the blade root end of said filler member, C. means adapted to connect said structural spar to a rotor including:
1. a first means bonded to one side of said loop in said fiber members,
2. a second means bonded to the other side of said loop in said fiber members,
3. a third means extending through said loop in said fiber members, and
4. means adapted to connect said first, second, and third means to a rotor.

19. A composite helicopter blade having a span and a chord and also having:
A. a structural spar including:
1. a central lightweight filler member extending along the blade longitudinal axis between substantially the blade root and the blade tip and having substantially flat sides extending substantially parallel to said blade chord,
2. a plurality of continuous, high strength fiber members extending substantially between the blade tip end of said filler member to the blade root end thereof and connected to said filler member throughout and shaped to form a loop extending beyond the blade root end of said filler member, B. means adapted to connect said structural spar to a rotor including:
1. a first means bonded to one side of said loop in said fiber members,
2. a second means bonded to the other side of said loop in said fiber members,
3. a third means extending through said loop in said fiber members, and
4. means adapted to connect said first, second, and third means to a rotor.

20. A composite helicopter blade having:
A. a structural spar including:
1. a central lightweight filler member extending along the blade longitudinal axis between substantially the blade root and the blade tip, 2. a plurality of continuous, high strength fiber members extending substantially between the blade tip end of said filler member to the blade root end thereof and connected to said filler member throughout and shaped to form a loop extending beyond the blade root end of said filler member, B. additional filler material of selected shape and connected to said spar to cooperate therewith in forming the blade cross sectional shape and including:
1. a counterweight member extending along the blade span at the blade leading edge, C. a skin member enveloping said spar and said additional filler material to produce a smooth blade surface, D. means adapted to connect said structural spar to a rotor including:
1. a first means bonded to one side of said loop in said fiber members,
2. a second means bonded to the other side of said loop in said fiber members,
3. a third means extending through said loop in said fiber members, and
4. means adapted to connect said first, second and third means to a rotor.

21. A composite helicopter blade having:
A. a structural spar including:
1. a central lightweight filler member extending along the blade span between substantially the blade root and the blade tip,
2. a plurality of high strength fiber members extending between the blade tip on one side of said filler member to the blade root and therebeyond and then doubling back so as to form a loop and then extending from the blade root to the blade tip on the opposite side of said filler member and being bonded to said filler member on both sides thereof throughout substantially the full span dimension of the filler member, B. means adapted to connect said structural spar to a rotor including:
1. a first member bonded to said fiber member on one side of said filler member,
2. a second member bonded to said fiber members on the opposite side of said filler member,
3. a pin member extending through said loop in said fiber members, and
4. means adapted to connect said first and second members and said pin member to the rotor.

22. A composite helicopter blade having:
A. a structural spar including:
1. a central lightweight filler member extending along the blade span between substantially the blade root and the blade tip,
2. a plurality of high strength fiber members extending between the blade tip on one side of said filler member to the blade root and therebeyond and then doubling back so as to form a loop and then extending from the blade root to the blade tip on the opposite side of said filler member and being bonded to said filler member on both sides thereof throughout substantially the full span dimension of the filler member, B. a blade root cuff member including:
1. a first blade cuff extension member overlapping the blade spar and bonded to said fiber members on one side of said filler member,
2. a second blade cuff extension member overlapping the blade spar and bonded to said fiber members on the opposite side of said filler member,
3. aligned apertures in said cuff member, and C. a pin member extending through said aligned apertures and through said loop in said fiber members.

23. A composite helicopter blade having:
A. a structural spar including:
1. a central lightweight filler member extending along the blade span between substantially the blade root and the blade tip,
2. a plurality of high strength fiber members of substantially U-shaped cross section with the two legs thereof extending substantially between the blade tip end and the blade root end and bonded to said filler member and with the curved portion of the U forming a loop extending beyond the blade root end of said filler member, B. means adapted to connect said structural spar to a rotor including:
1. a first means bonded to said fiber members,
2. a second means bonded to said fiber members,
3. a third means extending through said loop in said fiber members, and
4. means adapted to connect said first, second and third means to the rotor.

24. A composite helicopter blade having:
A. a structural spar including:
1. a plurality of high strength fiber composite members extending between substantially the blade tip and substantially the blade root and doubling back so as to form a loop and then extending from substantially the blade root to substantially the blade tip so as to form a fiber composite member of U-shaped cross section, when viewed along the chord plane of the blade, B. a skin member enveloping said spar and bonded to the legs of the U-shaped fiber composite member and including a plurality of bonded layers of fiber composite members each extending in a direction so as to form an angle with respect to the blade longitudinal axis and having layers forming angles on opposite sides of the blade longitudinal axis so as to form a torque load carrying boot to produce a smooth blade surface, and C. means adapted to connect said structural spar to a rotor including:
1. a first member bonded to one leg of the U of said fiber composite member,
2. a second member bonded to the other leg of the U of said composite member.

25. A blade according to claim 24 wherein said fiber composite members of said skin member and said spar are fabricated in separate layers and wherein the layers of the spar fiber composite members are interleaved with the layers of the skin member fiber composite members.

26. A composite helicopter blade having:
A. a structural spar including:
1. a plurality of high strength members extending between substantially the blade tip and substantially the blade root and doubling back so as to form a loop and then extending from substantially the blade root to substantially the blade tip so as to form a member of U-shaped cross section, B. a skin member enveloping said spar and bonded to the legs of the U-shaped member and including a plurality of bonded layers of members each extending in a direction so as to form an angle with respect to the blade longitudinal axis and having layers forming angles on opposite sides of the blade longitudinal axis so as to form a torque load carrying boot to produce a smooth blade surface, and C. means adapted to connect said structural spar to a rotor including:
1. a first member bonded to one leg of the U of said member,
2. a second member bonded to the other leg of the U of said member.

27. A blade according to claim 26 wherein said members of said structural spar and said blade skin are fabricated of fiber composite, bonded metal wire or bonded plastic or metal sheets, or a combination thereof.

28. A blade according to claim 27 wherein said members of said spar and said skin member are fabricated to be a plurality of separate layers and with the layers of the spar interleaved with the layers of the skin member.

29. A composite helicopter blade having:
A. a structual spar including:
1. a plurality of high strength fiber composite members of substantially U-shaped cross section with the two legs thereof extending substantially between the blade tip end and the blade root and with the curved portion of the U forming a loop extending toward the blade root, B. a skin member enveloping and bonded to two legs of said spar and including a plurality of bonded layers of fiber composite members each extending in a direction so as to form an angle with respect to the blade longitudinal axis and having layers forming angles on opposite sides of the blade longitudinal axis so as to form a torque load carrying boot, and C. means adapted to connect said structural spar to a rotor including:
1. a first means bonded to one leg of said fiber composite members,
2. a second means bonded to the other leg of said fiber composite members,
3. a third means extending through said loop in said fiber composite members, and
4. means adapted to connect said first, second, and third means to the rotor.

* * * * *